Jan. 23, 1968  C. A. NAPOR ET AL  3,364,551
MEANS FOR ASSEMBLING CARTRIDGES
Filed Oct. 23, 1965  11 Sheets-Sheet 1

INVENTORS
CARL A. NAPOR
WILLIAM T. ENGEL
BY
ATTORNEY

Jan. 23, 1968  C. A. NAPOR ETAL  3,364,551
MEANS FOR ASSEMBLING CARTRIDGES

Filed Oct. 23, 1965  11 Sheets-Sheet 3

INVENTORS
CARL A. NAPOR
WILLIAM T. ENGEL
BY
ATTORNEY

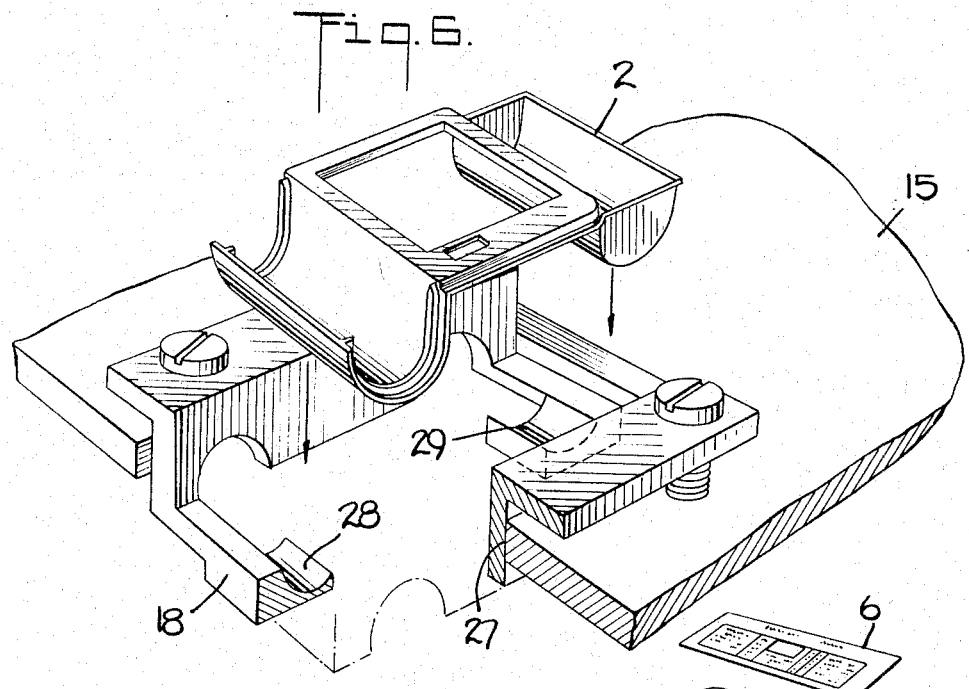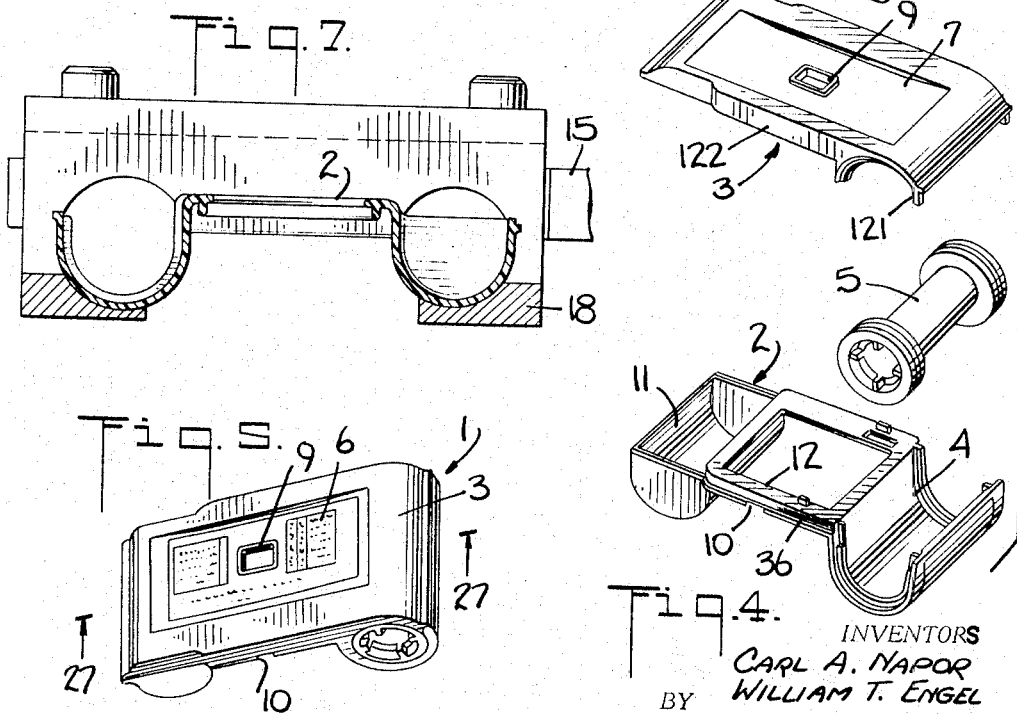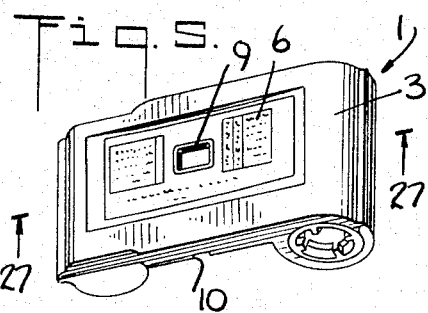

Jan. 23, 1968   C. A. NAPOR ETAL   3,364,551
MEANS FOR ASSEMBLING CARTRIDGES
Filed Oct. 23, 1965   11 Sheets-Sheet 5

INVENTORS
CARL A. NAPOR
WILLIAM T. ENGEL
BY
Norman M Hallow
ATTORNEY

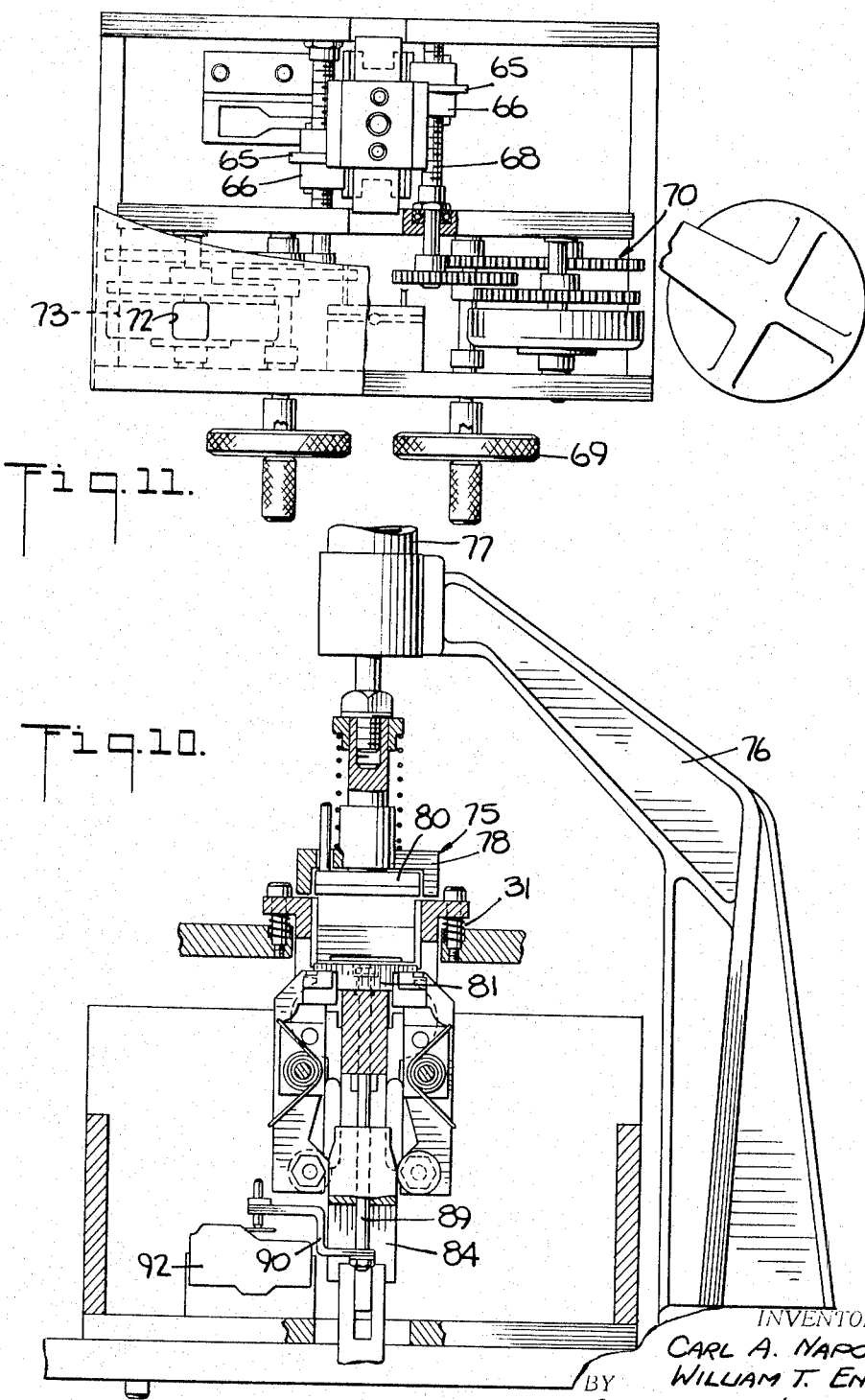

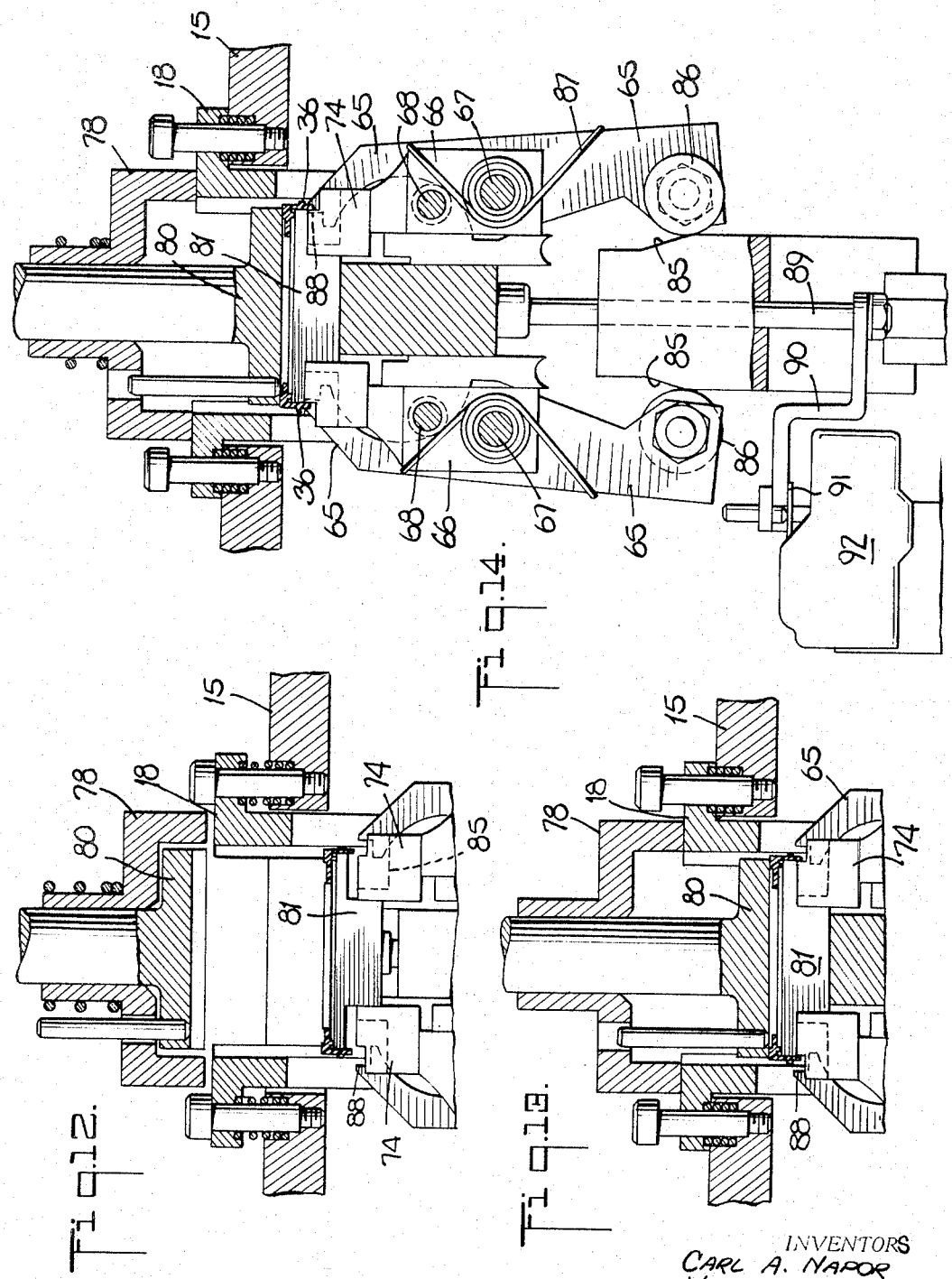

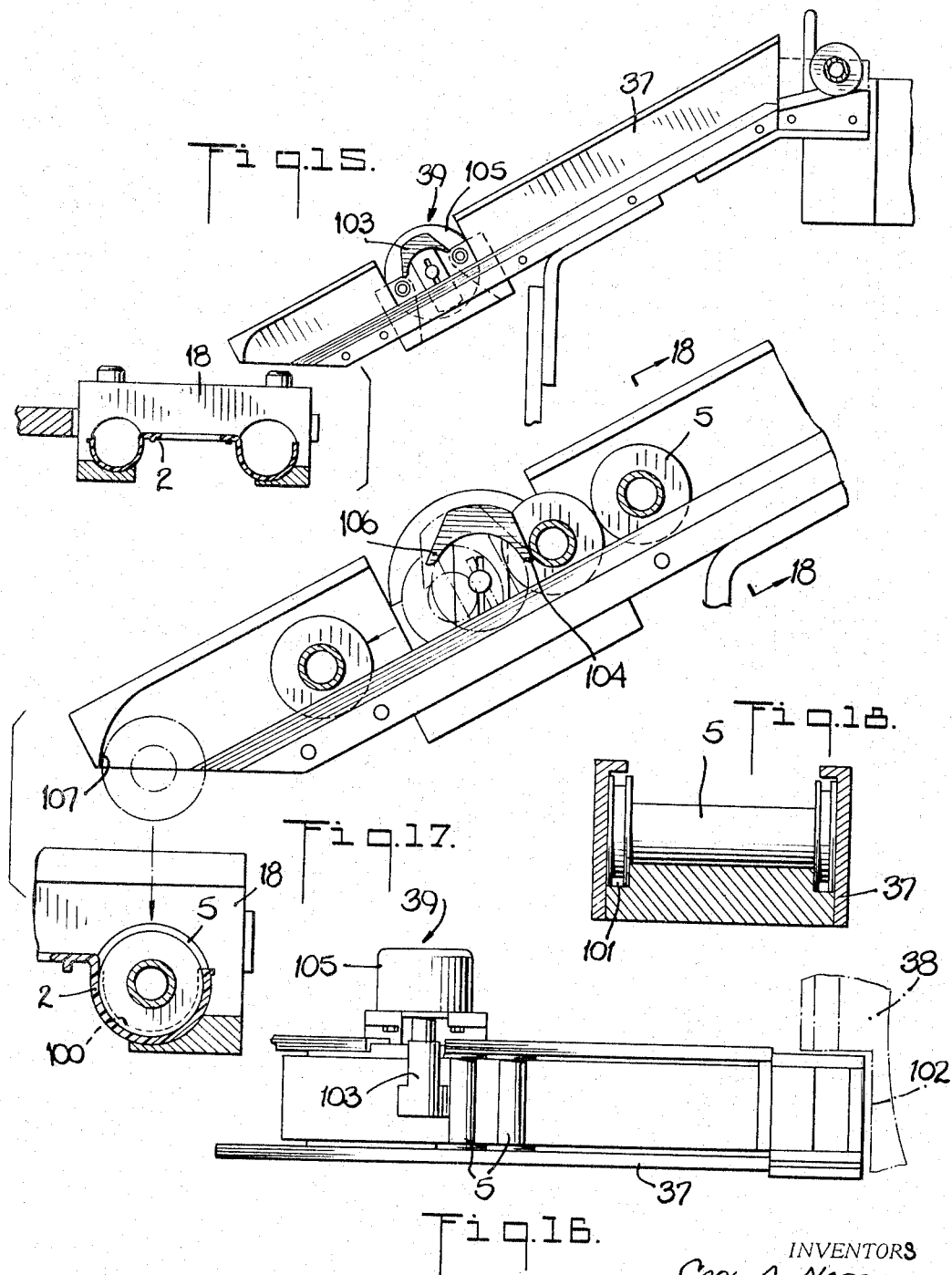

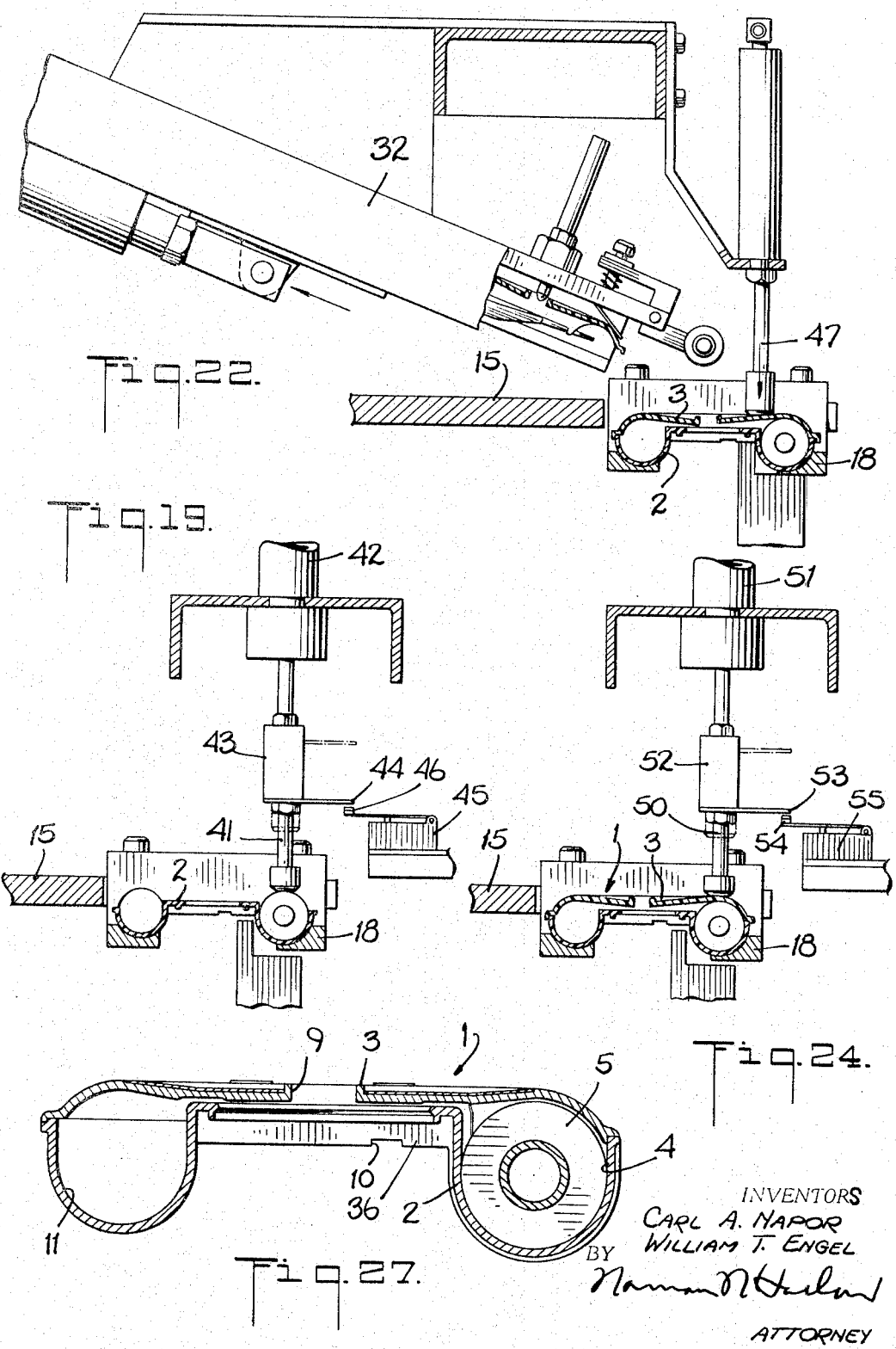

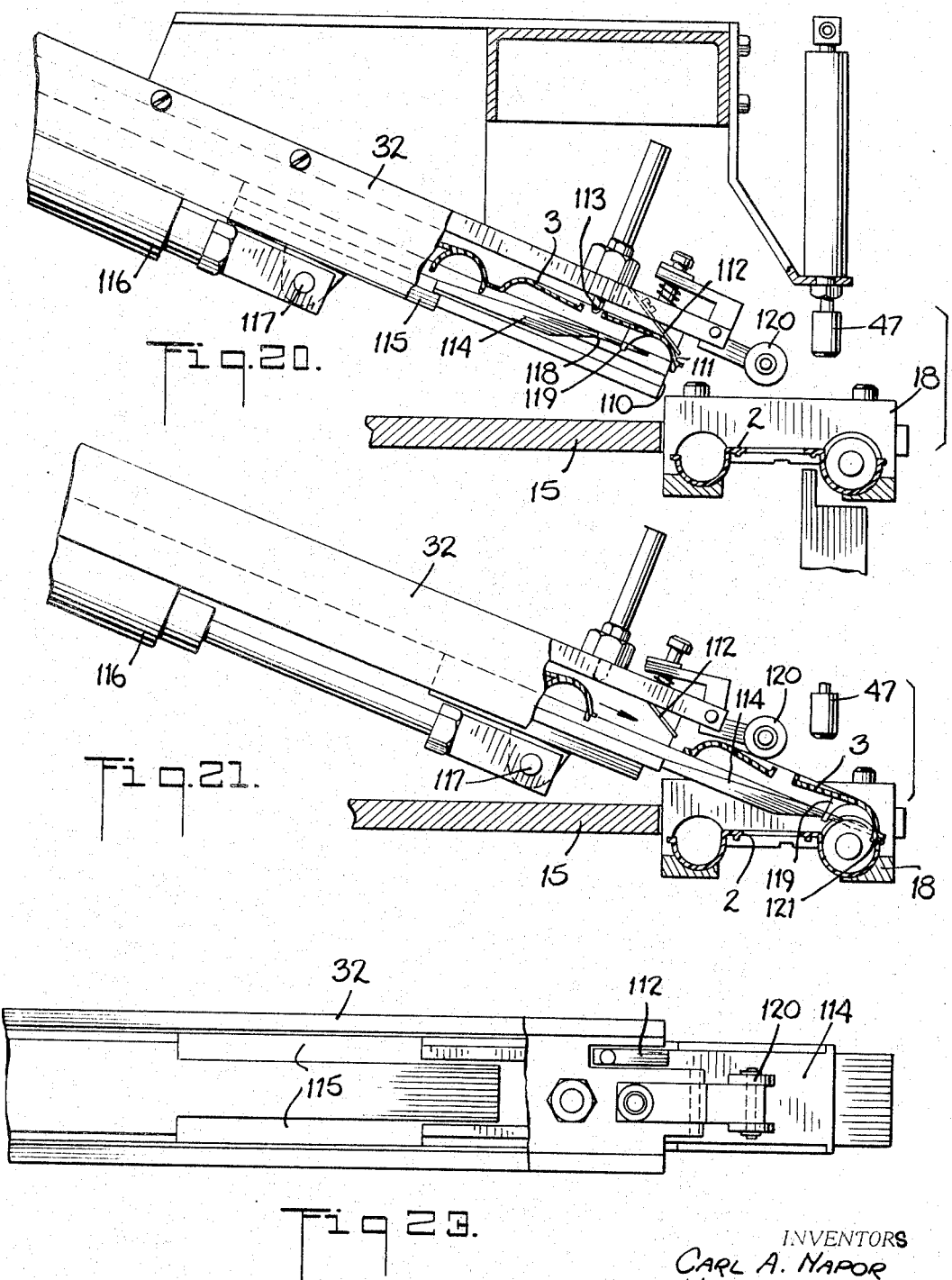

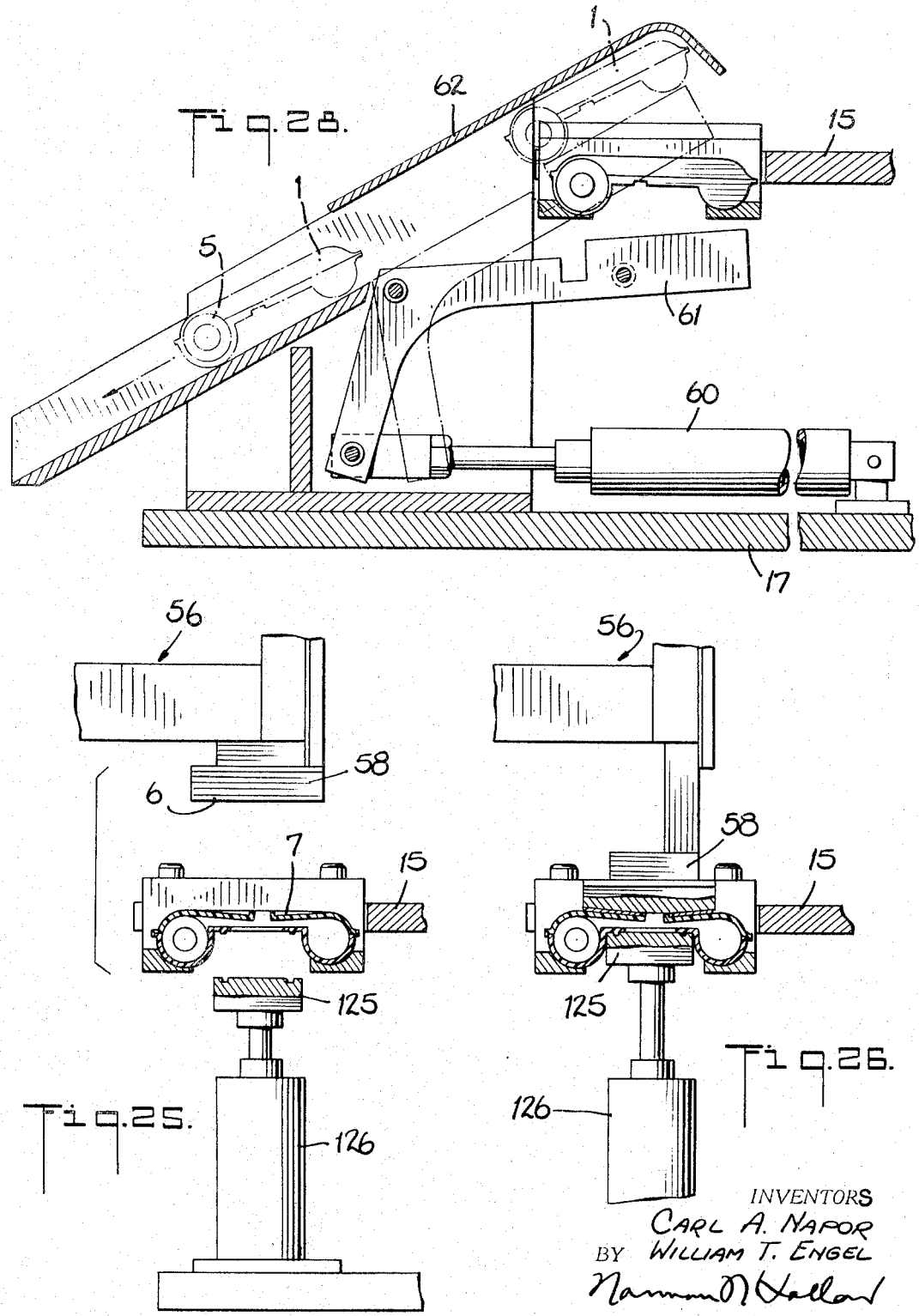

United States Patent Office 3,364,551
Patented Jan. 23, 1968

3,364,551
MEANS FOR ASSEMBLING CARTRIDGES
Carl A. Napor, Glen Ridge, and William T. Engel, Union, N.J., assignors to Kahle Engineering Company, Union City, N.J., a corporation of New Jersey
Filed Oct. 23, 1965, Ser. No. 503,025
13 Claims. (Cl. 29—208)

The present invention relates to a means for assembling film cartridges or similar spool and film strip enclosures and more particularly relates to a method and means for facilitating the assembly of such an enclosure including appropriate exposure indexing and labelling.

The means of the present application apply to cartridges such as are now in wide use for photography wherein the film is pre-packaged in a casing for loading into a camera. The casings are suitably laballed and are also notched for automatic camera exposure setting and each casing includes a roll of film and a film winding spool keyed or otherwise adapted for the film advancing operation by the camera. Such cartridges for example are described in United States Patents Nos. 3,138,081 and Des. 195,746. These film cartridges are supplied to the camera user as a sealed unit and need only be dropped into the camera in such a way that the camera film winding knob engages the internal film spool in the cartridge. Thereafter the film and a suitably indexed protective paper are advanced by rotation of the camera knob either automatically or with relation to indexing numbers on the protective paper and visible through a suitable aperture in the cartridge. The cartridges themselves are also preferably labelled to indicate the film type and the camera type and in addition the cartridges preferably have suitably positioned notches formed thereon which cooperate with exposure setting means with the camera cases. The assembly of such a cartridge including at least two casing members plus the film spool and the film and protective paper is a relatively complex operation and one which preferably should be carried out automatically to provide a sufficient number of reliable cartridges at a suitably low cost.

The present invention provides a novel method and means for facilitating the automatic assembly of the completed cartridge and more particularly provides a novel method and means of pre-assembly wherein the cartridge including the spool and the related notching and cartridge labelling are performed by an automatic means which presents the cartridge thus assembled in a continuous supply for a final film loading and sealing operation.

Accordingly, an object of the present invention is to provide an improved means for automatically assembling a film cartridge.

Another object of the present invention is to provide a means for assembling a film cartridge including indexing and labelling steps.

Another object of the present invention is to provide a relatively high-speed and automatic machine for the pre-assembly of film cartridges including a casing and a cooperating spool.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 4 is an exploded perspective view of a cartridge casing of the type assembled by the machine of FIG. 1;

FIG. 5 is a perspective view of the assembled cartridge;

FIG. 6 is an enlarged perspective view illustrating a nest for a cartridge bottom;

FIG. 7 is a vertical sectional view showing a cartridge bottom in a turret nest including a hold-down shoe;

FIG. 10 is a vertical sectional view of the notcher taken along line 10—10 on FIG. 8;

FIG. 11 is a top plan view partially cut away of the notcher of FIG. 8;

FIGS. 12–14 are vertical sectional views of the notcher illustrating the notching sequence;

FIG. 15 is a vertical sectional view illustrating the spool feeder taken along line 15—15 on FIG. 2;

FIG. 16 is a top plan view of the spool feeder of FIG. 15;

FIG. 17 is an enlarged detailed side elevational view of the spool feeder illustrating the gate and the end portion;

FIG. 18 is a vertical sectional view of the spool feeder taken along line 18—18 on FIG. 17;

FIG. 19 is a vertical sectional view of the spool sensing station;

FIGS. 20–22 are side elevational views partially cut away illustrating the cartridge top feeder and the cartridge closing station illustrating the top feeding and application;

FIG. 23 is a top plan view of the cartridge top feeder;

FIG. 24 is a vertical sectional view illustrating the cartridge top sensing station;

FIGS. 25 and 26 are vertical sectional views of the label applying station illustrating the application of a label to the closed cartridge;

FIG. 27 is a vertical sectional view of an assembled, labelled, and notched cartridge taken along line 27—27 on FIG. 5; and FIG. 28 is a vertical sectional view of the cartridge ejector station illustrating the removal of an assembled cartridge from the assembly turret.

Figure 1:
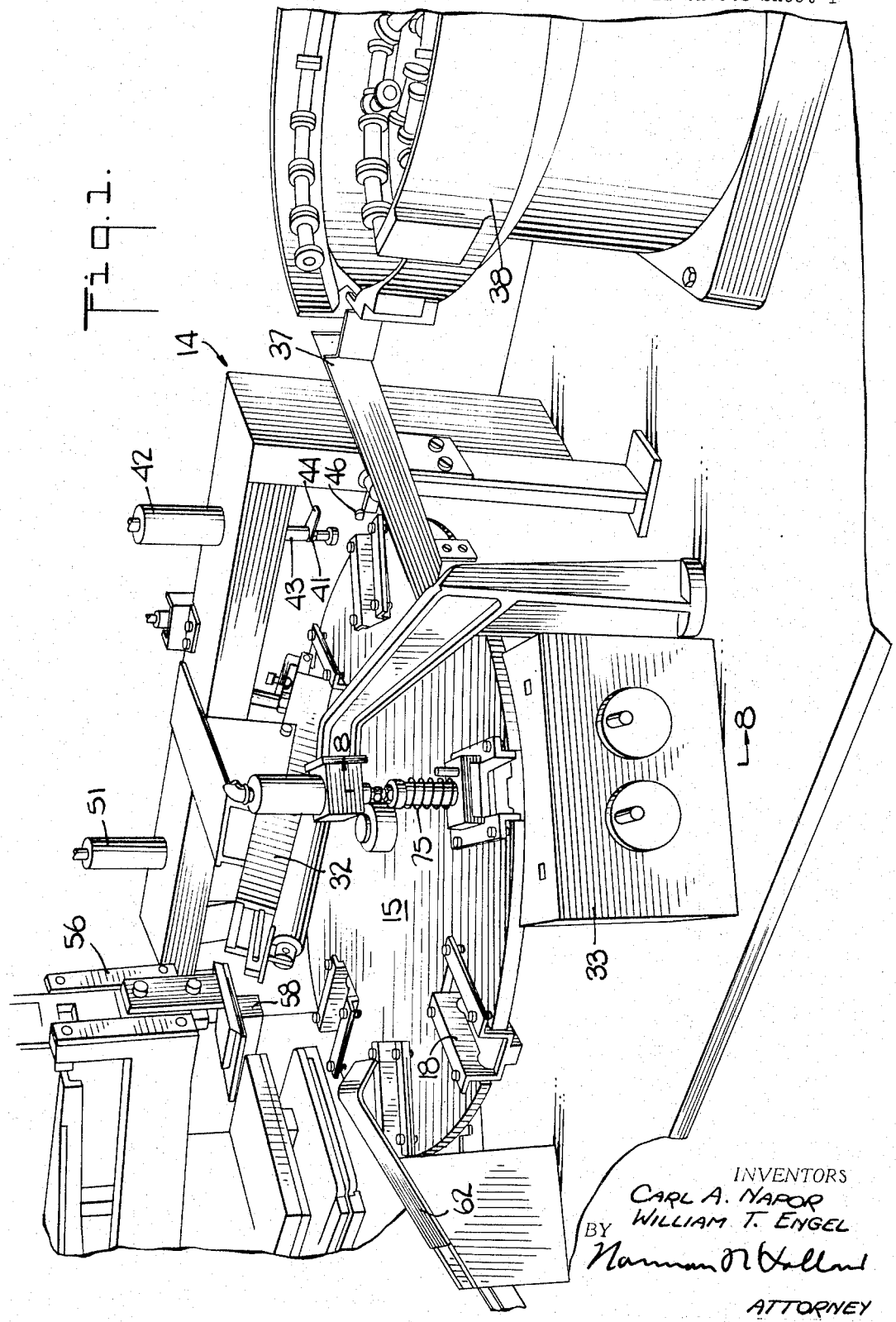
FIG. 1 is a perspective view of the top portion of the cartridge assembly machine in accordance with the present invention.

The means of the present invention provides the initial assembly of a film cartridge 1 as illustrated in FIGS. 4, 5, and 27. As seen in these figures the cartridge 1 comprises a plastic casing having a cartridge bottom 2 and an enclosing cartridge top 3. The cartridge bottom 2 and top 3 define a generally cylindrical cavity 4 at one end which rotatably contains a film winding spool 5 enclosed therein in the final sealed cartridge. A label 6 is attached to the cartridge 1 at a convenient portion such as in the recess 7 provided in the cartridge top 3 adjacent a film indicating aperture 9. Preferably, the film cartridges 1 which are inserted as a unit into the camera include one or more exposure indexing notches 10 properly positioned on an exposed surface of each of the cartridges 1 to engage exposure indexing levers in the camera.

As supplied to the user, the magazine 1 includes a film and an interwound strip of protective paper contained in the cylindrical cavity 11 defined by the cartridge bottom 2 and top 3 at the end opposite to the spool 5 and having a free end fastened to the spool 5 to permit the film to be selectively advanced past the cartridge exposure opening 12 as the film is exposed.

The machine of the present invention provides a series of assembly means adapting the cartridge assembly and manufacture to an automatic process as performed by the cartridge assembly machine.

GENERAL DESCRIPTION

The pre-assembly is preferably performed on the machine 14 including an indexing turret 15 which will now be described generally with particular reference to FIGS. 1, 2, and 3.

The turret 15 is mounted upon a vertical indexing shaft 16 journalled on a suitable base 17 to permit intermittent advancing of the turret 15 to move a series of cartridge bottom nests 18 successively to a series of peripherally spaced assembly stations where the cartridge assembly operations are performed as will be more fully described below.

Figure 3:
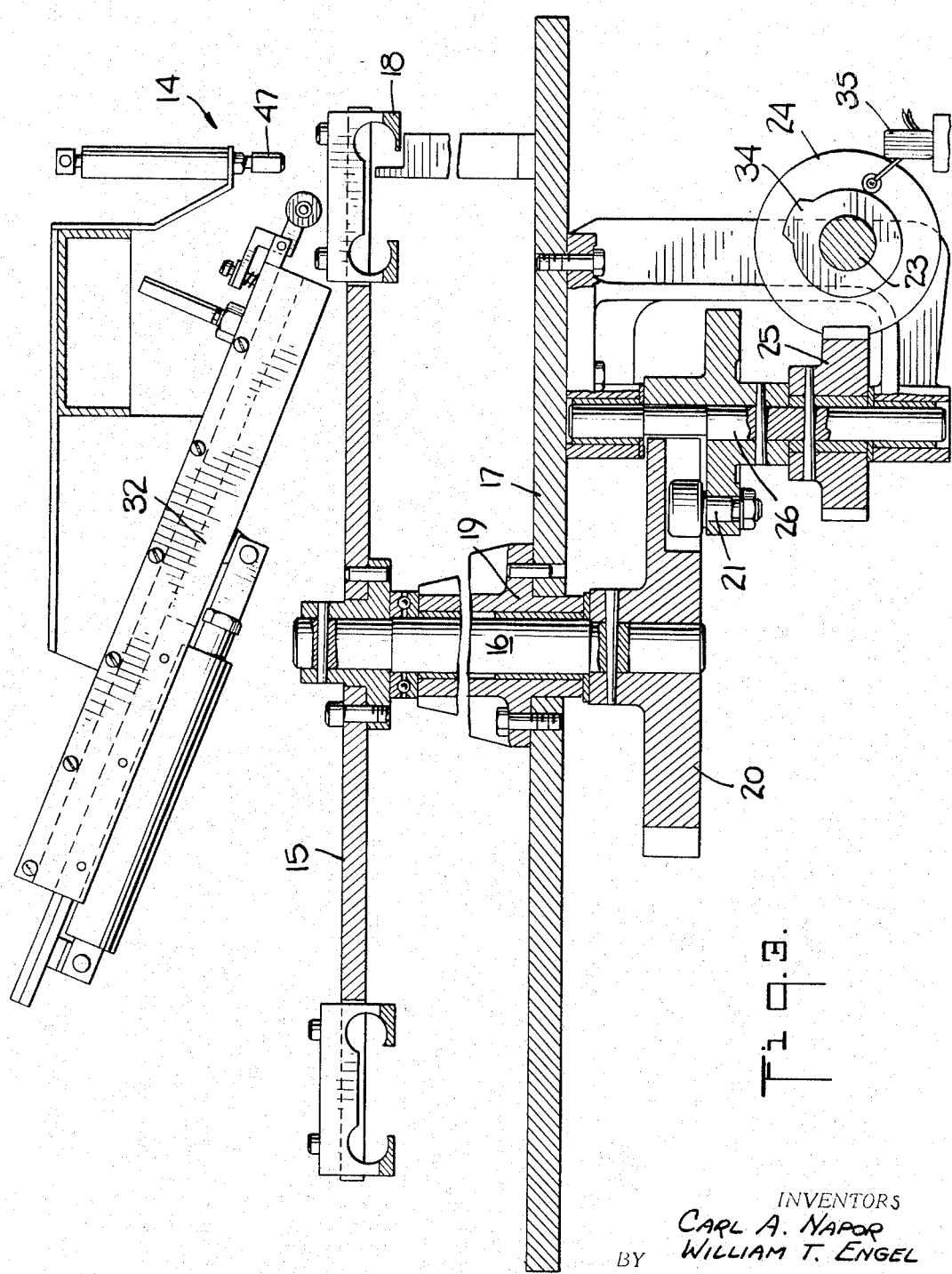
FIG. 3 is a vertical sectional view of the assembly machine illustrating the turret drive taken along line 3—3 on FIG. 2 and including the feed chute for the top portions of the cartridge casing.
Figure 9:
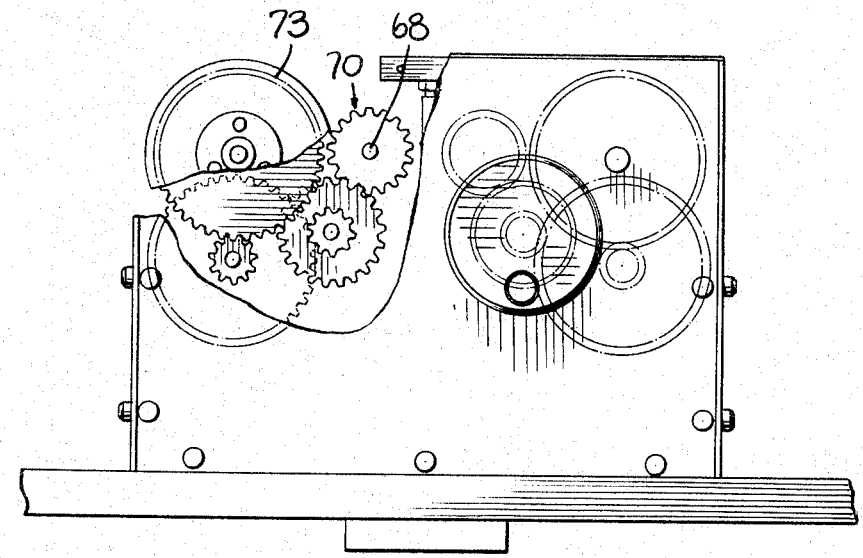
FIG. 9 is a vertical sectional view of the notcher taken along line 9—9 on FIG. 8.
Figure 8:
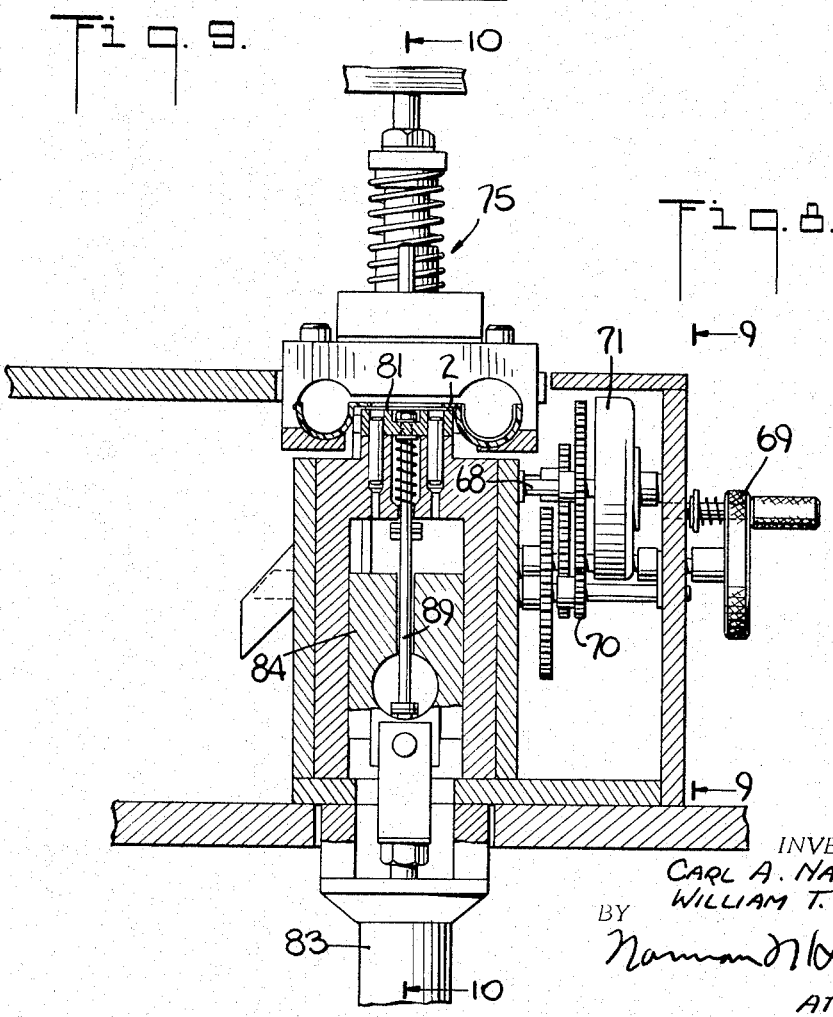
FIG. 8 is a vertical sectional view of the cartridge notches taken along line 8—8 on FIG. 1.

As illustrated in FIG. 3, the indexing shaft 16 is mounted in a bearing 19 on the top of the base 17 and a Geneva drive including a Geneva wheel 20 and a Geneva roller drive 21 provide a suitable indexing drive at the bottom of the shaft 16.

A suitable electric drive motor (not shown) turns a cam shaft 23 driving the turret 15 through the intermediation of the gears 24 and 25 and the Geneva roller drive 21 mounted on a support shaft 26 and the Geneva wheel 20 attached to the bottom of the turret indexing shaft 16.

The cam shaft 23 also mounts a series of control cams such as cam 34. These control cams open and close switches 35 which operate air motors or cylinders or other electric drives in synchronism with the turret 15 movement as will be further described below.

The preferred embodiment of the assembly machine 14 has eight assembly stations A–H at the periphery of the turret 15 and in order to provide for simultaneous operation of all stations a corresponding number of cartridge bottom nests 18 are provided in suitable slots 27 at the periphery of the turret 15.

The nests 18 are illustrated in detail in FIG. 6 including curved support surfaces 28 and 29 for engaging the opposite curved end portions of the cartridge bottoms 2. Each nest 18 is floatingly supported above the surface of the turret 15 on spaced bolts 30 by compressible springs 31.

At station A, an operator or a suitable mechanical feed device positions a cartridge bottom 2 in each nest 18 as the turret 15 presents the cartridge nest 18 at station A. The same operator or another suitable automatic feed also feeds the cartridge tops 3 into the upper end 31 of the cartridge top feed chute 32. The cartridge feed chute 32 thereafter supplies the tops 3 to the cartridge bottoms 2 at station E which will be described below.

Station B is the cartridge notching station. At this station a notcher 33 cuts appropriately positioned notches 10 in the flange portion 36 of the cartridge bottom 2 as best illustrated in FIG. 27. As described above, the notch 10 acts as an automatic exposure setting means when the cartridge 1 is later loaded into a camera. The notcher 33 and its operation as illustrated in detail in FIGS. 8–14 will be described below under an appropriate heading.

After the cartridge bottom 2 has been notched at station B, the notched cartridge is carried by the turret to a spool insertion station C. At this station a spool 5 is fed into the curved portion of the spool cavity 4 provided at the outer end of the cartridge bottom 2. The spools 5 are fed to this position by an inclined feed chute 37 which is filled by hand or by a suitable spool feeding device 38 and a gate member 39 synchronized with the turret movement releases a spool 5 at the proper interval permitting the spool 5 to roll down the chute 37 and to drop into the cartridge bottom 2 through the chute outlet positioned directly above the outer edge of the cartridge bottom 2. The spool insertion station C will be further described below under an appropriate heading.

The cartridge bottom 2 with the inserted spool 5 is next transported to a spool detecting station D. At this station a sensing rod 41 is lowered by an air motor or air cylinder 42 so that it engages a portion of a spool 5 resting on the cartridge bottom 2. The normally expanded spring tensioned sensing rod 41 is compressed as the sensing rod 41 engages the spool 5 and the presence of a spool 5 and the compression of the resilient spring member 43 prevent a contact arm 44 from engaging and operating an electric switch 45 having a switch arm 46 positioned immediately below the contact arm.

If, however, there is no spool 5 on a cartridge bottom 2, the sensing rod 41 continues down into the area which would normally be occupied by a spool 5 causing the contact arm 44 to close the switch 45 thereby advancing a suitable indicator or machine stop circuit thereby indicating to the machine operator that no spool 5 is present in the cartridge bottom 2 and that the spool feeding portion of the machine is either empty or operating improperly.

If a spool 5 has been properly positioned in the cartridge bottom 2, the turret 15 next transports the cartridge bottom 2 including the spool 5 to the cartridge top applying station E at which position a cartridge top 3 is applied over the cartridge bottom 2 from the top feed chute 32 and is placed into position on the cartridge bottom 2 by a plunger 47. The cartridge now has been assembled with the spool 5 loosely contained in the spool cavity 4 and with the top 3 properly positioned but not fastened onto the cartridge bottom 2.

The assembled cartridge 1 is next transported to a cover detecting station F. At this position a sensing rod 50 similar to the spool sensing rod 41 of position C is lowered against the cartridge top 3 by a suitable air cylinder 51. The presence of a top 3 compresses a resilient portion 52 (FIG. 24) of the sensing rod 50 holding a contact arm 53 spaced from the switch arm 54. If no top 3 is present, the downward movement of the sensing rod 50 against the spool 5 causes the switch 55 to close and a suitable warning device or machine stopping circuit to be activated.

The assembled cartridge 1 is next transported to the labelling station G where a label applying machine 56 of the type adapted to apply pressure sensitive labels to article surfaces and conveniently of the commercially available type including a vertically reciprocating positioning arm 58 applies a generally rectangular label 6 to the recessed central portion 7 of the cartridge top 3 as illustrated in FIGS. 25 and 26.

The notched, assembled, and labelled cartridge 1 with a spool 5 in its proper position is now ready for the subsequent insertion of a roll of film and a protective paper strip and the cartridge 1 is removed from the assembly machine at the next and final station H. An air operated and cam controlled cylinder 60 rotates an L-shaped ejection lever 61 to lift the completed cartridge assembly 1 clear of the nest 18 and in position to permit the cartridge 1 under force of gravity to slide down an exit chute 62 to a suitable conveyor or other cartridge container.

THE NOTCHING STATION C

As indicated above, the cartridges 1 are inserted into cameras and preferably the cartridges 1 include notches 10 selectively cut to set an exposure control on the camera in acordance with the particular type of film contained in the cartridge. These notches 10 are conveniently formed on one or both of two thin flanges 36 connecting the opposite film and spool holding cavities 11 and 4 at opposite ends of the cartridge 1 and as best illustrated in FIG. 27. When the cartridge 1 is inserted into the camera, a suitably positioned exposure indexing member engages a notch 10 to set the camera exposure in accordance with the position or depth of the notch or notches provided on the cartridge 1.

These notches 10 are formed or cut on the cartridge at the notching station C by the notcher 33. One or more notching tools are adjustably positioned by the notcher 33 to perform this notching operation and the notches 10 are formed as each cartridge 1 is positioned at station B and is properly clamped into notching position. A preferred embodiment of the notcher 33 as illustrated in FIGS. 8–14 will now be described in which a pair of notching tools 65 (FIG. 14) are provided to cut an appropriately positioned notch in each of the two flange portions 36 (FIG. 27).

One of these notching tools may be inactivated or removed or additional tools or dual cutting heads and appropriate dies may be provided if necessary to provide any number of varying arrangements of notching patterns including one or more notches. In a convenient exposure indicating system, as illustrated, one notch 10 may be provided on each of the two opposite flanges 36 and the position of the notch 10 lengthwise of the flange may be used to set the camera exposure at the correct amount.

As best seen in FIG. 14, notching tools 65 are mounted on brackets 66 in position to form the notches 10 in the two flanges 36. Each of the tools 65 is pivotally mounted on the bracket 66 by a suitable pivot 67 for swinging movement toward and away from the cartridge 1 positioned in the nest 18 at the notching station B. In order to provide for adjustment of the notching tool position lengthwise of the flanges 36, each of the notching tool mounting brackets 66 is mounted on a lead screw 68 rotatably mounted on the notcher frame and operatively connected to a notcher position wheel 69 (FIG. 8) through a step-down gear train 70. A visible indication is provided of the notching tool position by an indicator wheel 71 coupled to the gear train 70 and visible through an aperture 72 (FIG. 11) through the notcher top 73.

The rotation of a notcher position wheel 69 in one direction or the other thus moves a notching tool 65 axially of the lead screw 68 to position the notching tool 65 in predetermined notching position as indicated by the setting of the indicator wheel 71.

A pair of notching dies 74 are preferably provided in the notcher 33 including spaced slots 82 positioned to cooperate with the notching tools 65 to form the necessary notches 10 in the flange sections 36 of the cartridge 1. These slots are provided in pre-determined positions to cooperate with the indicator wheels 71 for providing a range of different exposure indicies as required.

In order to facilitate the formation of smoothly cut notches it is necessary for the two flanges 36 of each cartridge 1 to slide downwardly over the sides of the dies 74 as illustrated for the cutting position in FIGS. 13 and 14. This hold down operation is provided by the notching clamp 75 mounted above the nest 18 on the clamp support 76 as best illustrated in FIG. 10. The notching clamp 75 includes an air motor or air cylinder 77 for moving the clamp 75 into engagement with a cartridge 1 in the nest 18.

As best illustrated in FIGS. 12 and 13 the clamp 75 includes a resiliently mounted foot 78 which engages the top of the cartridge nest 18 to move the nest 18 down against the turret 15 against the force of the nest support springs 31. This in turn moves the cartridge bottom 2 down over the dies 74 and also depresses a sensing plate 81 resiliently mounted to engage the central portion of the cartridge bottom 2. Thereafter, a central cartridge bottom clamping portion 80 continues to move downwardly under the force of the air cylinder 77 to engage the cartridge bottom 2 and to hold it firmly in position in the nest 18 with the flanges 36 spaced outwardly of the notching slots 82 on the spaced notching dies 74. After the cartridge bottom 2 has been thus firmly positioned in place, a second air motor or air cylinder 83 (FIG. 8) mounted beneath the notcher 33 raises a notching cam 84 vertically towards the notching tools 65 with its outer camming surfaces 85 engaging cam rollers 86 on the notching tools 65 causing the tops of the notching tools 65 to swing inwardly against the force notching tool positioning springs 87 so that the cutting edges 88 of the notching tools 65 cut the flanges 36 in cooperation with the notching dies 74 thus forming exposure indexing notches 10 in the pre-determined positions on the cartridge 1.

Preferably a cut-off device is included in the notcher 33 to stop the machine or to activate a warning device in the event no cartridge bottom 2 is present at the notching station 33.

As best seen in FIG. 10 the cut-off device includes a vertical sensing rod 89 which is moved downwardly by the sensing plate 81 as the above described foot 78 moves the nest 18 and cartridge 1 downwardly into the notching position. As the rod 89 is moved down the contact arm 90 engages the switch arm 91 to open the switch 92 permitting continued operation of the machine and the above described sequence of notching operations.

In the event there is no cartridge bottom 2 present, the sensing plate 81 and rod 89 remain in a raised position so that the switch 92 remains closed. In this condition and at the commencement of the notching operation the closed switch 92 activates the machine cut-off or warning indicator.

SPOOL FEED STATION C

To prepare the cartridge 1 for a final assembly operation, a spool 5 is inserted in the cartridge bottom 2 at the spool feed station C as illustrated in FIGS. 15–18. The actual positioning of the spool 5 in the cartridge bottom 2 is controlled by a pair of semi-circular flanges formed on the cartridge bottom 2 as illustrated at 100 in FIG. 17. These flanges cooperate with circular grooves 101 in the opposite ends of the rolls 5 (FIG. 18).

Figure 2:
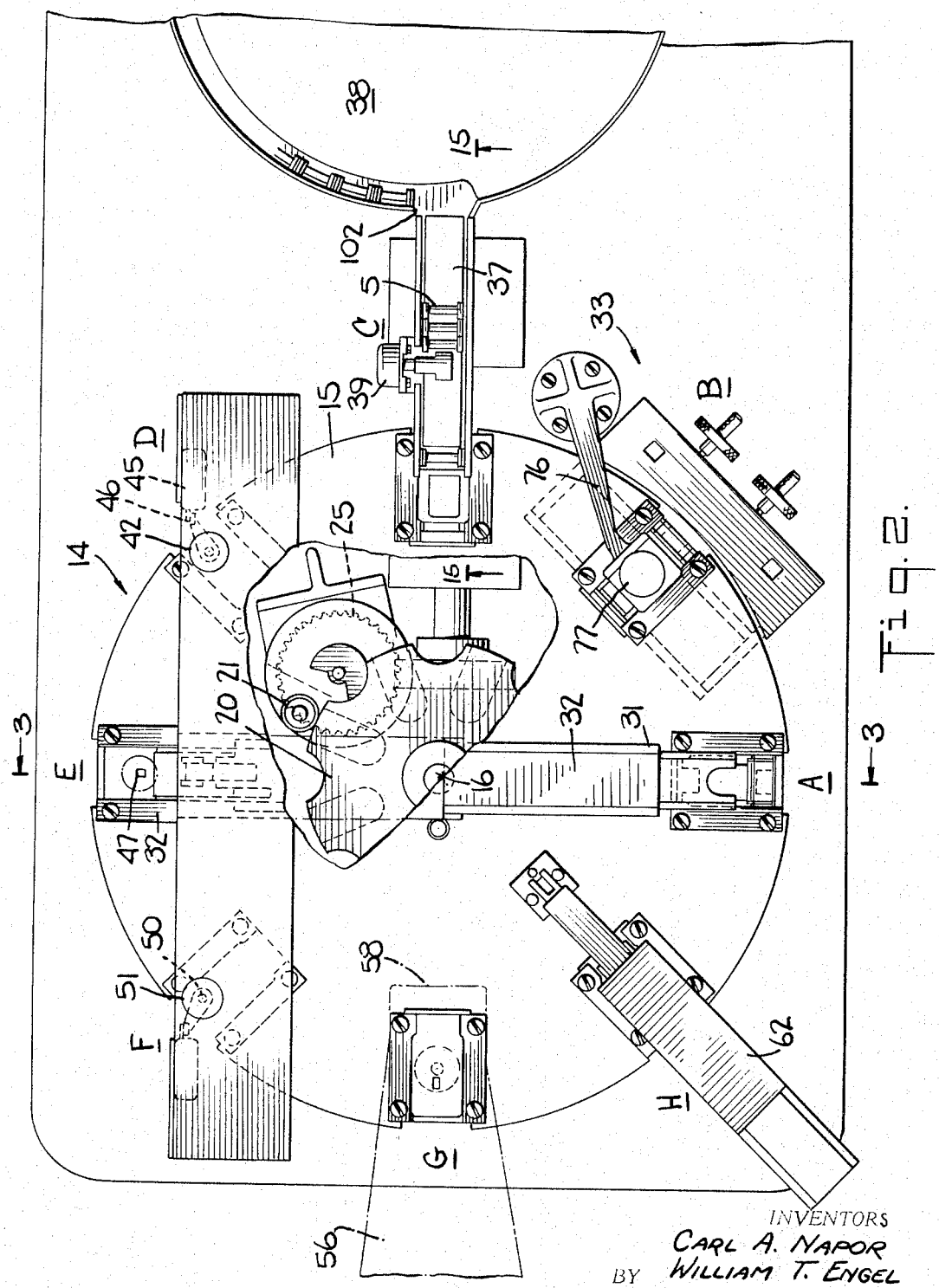
FIG. 2 is a top plan view of the machine of FIG. 1.

A supply of spools 5 is loaded into a spool feeding device such as illustrated at 38 in FIG. 1. These devices which are commercially available for feeding small cylindrical articles such as spools accept the spools with random orientation in a hopper and thereafter vibratory or other action causes the spools to advance in single file to an outlet 102 where the spools 5 roll under the force of gravity down the feed chute 37. The spools 5 are fed from the hoppering device 38 at least the indexing rate of the turret 15 to keep a full supply of spools in the feed chute 37. A gate 39 is mounted on the chute 37 to release the lowermost spool 5 after the turret has moved a cartridge bottom 2 into position at the spool feeding station C. A preferred embodiment of the gate 39 includes a spool stop 103 which is shaped with a generally C-shaped cross-section as best seen in FIG. 17. The edge 104 of the stop 103 engages the center of the lowermost spool 5 when the gate is in its closed position as illustrated by the solid lines in FIG. 17 preventing downward movement of the endmost spool 5. After a cartridge bottom 2 has been indexed into position by the turret 15 at station C, an electric drive motor 105 rotates the stop 103 counterclockwise to the position illustrated in dash-dot lines in FIG. 17 permitting the endmost spool 5 to move under the stop member and to engage its forward edge 106. Thereafter the stop 103 swings back to its original position under the force of a spring bias releasing the endmost spool 5 from edge 106 permitting it to roll through the exit end 107 of the spool feed chute 37 and to drop into position on the cartridge bottom 2. Meanwhile, the center of the next spool 5 is engaged by the returning stop edge 104 so that it is held in the chute 37 until the gate 39 again moves through the above described release motion under the control of a suitable cam or cam shaft 23 and a cooperating switch which momentarily energizes the motor 105 and causes it to turn the required amount and to return by the force of a suitable spring to its original position.

The cartridge bottom 2 with the spool 5 in place is now stepped by the turret 15 to the spool sensing station D where, as described above, a sensor operates a suitable warning device or machine stopping device in the event a spool 5 is not positioned in the cartridge bottom 2.

TOP APPLICATION STATION E

The cartridge bottom 2 with the spool 5 in place is now presented at the top applying station E where a top 3 is fitted onto the cartridge bottom 2 by a top applicator.

The application of the top 3 is illustrated in detail in FIGS. 20–23.

As already indicated, an inclined cartridge top feed chute 32 preferably has its feed opening 31 located adjacent the cartridge bottom feeding station A to permit the machine operator or a suitable automatic feeder to feed molded plastic cartridge tops 3 into the feed chute 32. The lower end 110 of the feed chute 32 as illustrated in FIG. 20, is positioned above the cartridge nest 18 at the top loading or applying station E. The lowermost top 3 is fed by the force of gravity to the position illustrated in FIG. 20 with its forward edge 111 engaging an inclined spring stop 112 and with a spring detent 113 engaging the film indexing aperture 9 in the cartridge top 3. In order to move this endmost top 3 into the cartridge nest, with its outer end in registry with the outer end of the cartridge bottom 2, an injector arm 114 is poistioned beneath the top 3. The arm 114 is mounted on a carriage 115 adapted for sliding movement on the spaced guide rails 115 on the chute 32. An air motor or cylinder 116 pivotally connected to the carriage 115 at 117 and controlled by a cam on the cam shaft 23, slides the cartridge top 3 downwardly causing spaced abutting surfaces 118 on the injector arm 114 to engage a pair of depending projections 119 (FIGS. 4 and 21) on each cartridge top 3 formed by edges of the spool cavity 4. The injector arm 114 engages the top 3 thereby releasing it from the detent 113 and spring stop 112 and causing it to slide downwardly under a spring loaded injection roller 120 until the forward end of the top 3 engages the outer portion of the bottom 2. This engagement is facilitated by a pair of spaced projections 121 on top 3 (FIGS. 4 and 21) which abut the outer wall of the cartridge bottom 2 as illustrated in FIG. 27. FIG. 21 shows the injector arm 114 at its fully extended position with the outer end of the cartridge top 3 engaging the outer edge of the cartridge bottom 2 and having the top 3 inclined and resting on the injector arm 114 and with the injection roller 120 pressing downwardly of the cap top 3.

Thereafter the injector arm 114 is returned to its fully withdrawn position as illustrated in FIG. 22 as the top 3 has its inward portion swung downwardly with its spaced flange portions 122 (FIG. 4) being removed into registry with the corresponding upstanding flanges 36 on the cartridge bottom 2 by the downward movement of a cam controlled and synchronized air cylinder driven plunger 47 which engages and presses the top 3 down as the injector arm 114 is withdrawn.

The assembled cartridge 1 is now carried by the turret 15 to the above described top sensing station F where the sensing arm 52 operates as described to stop the machine or to activate a suitable indicator in the event a top 3 has not been properly applied to the cartridge bottom 2.

LABELLING STATION G

In an additional assembly step a label 6 is now applied to the recessed portion 7 of the top cover.

The label 6 is applied to each cartridge 1 as it is transported by the turret 15 to the labelling station G. A commercially obtained labeller may be conveniently used of the type which includes a vertically movable label applying head and which presses a pressure or heat sensitive or adhesive coated label 6 onto an article surface positioned therebelow. FIGS. 25 and 26 illustrate the label applying head 58 moving downwardly with a suitable label 6 thereon for application to the recessed portion 7 of the cartridge top 3.

In order to permit the label 6 to be pressed tightly against the cartridge top 3, a cartridge support 125 is raised into contact with cartridge bottom 2 by an air motor or air cylinder 126 under the control of a suitable cam on the cam shaft 23. After the labelling head returns to its raised position and as it moves into its next cycle, the machine turret 15 transports the assembled, labelled, and notched cartridge 1 to the cartridge ejection position H. The cartridge 1 is ejected as illustrated in FIG. 28 by the pivotally mounted ejector 61 whose upper arm swings against the cartridge 1 and lifts it clear of the nest 18 to the position illustrated at 1a whereupon the cartridge 1 slides down the ejection chute 62 under the force of gravity. The ejector arm is raised and lowered by an air motor or cylinder 60 controlled by a suitable valve timing cam arrangement under the control of a cam on the cam shaft 23.

It will be seen that the above described method and means provides assembled, labelled, and notched cartridges suitable for a series of final film insertion and sealing steps and wherein the above described assembly, notching, and labelling steps permit a simplified and substantially fully automatic operation under the direction of a single operator. The assembly means is capable of continuous operation at relatively high speeds and the various steps are set up for convenient observation during operation and for relatively simple initial adjustment or for whatever succeeding operating adjustments may be required during the course of the assembly operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. Means for automatically assembling a film cartridge having cooperating hollow top and bottom portions and a spool enclosed therein comprising the combination of a support for transporting one of said cartridge portions about an arcuate path, means for intermittently advancing said support for successively presenting the said one cartridge portion at a plurality of stations, means at one of said stations for forming indexing notches in the one said cartridge portion at a pre-determined location thereon, means at another of said stations for feeding a spool into each of said one cartridge portions, means at a subsequent station for applying one of the other of said cartridge portions to each of said one cartridge portions, and means at a subsequent station for removing the assembled cartridge from said support.

2. Means for automatically assembling a film cartridge having cooperating hollow top and bottom portions and a spool enclosed therein comprising the combination of a support for transporting one of said cartridge portions about an arcuate path, means for intermittently advancing said support for presenting the said one cartridge portion at a plurality of stations, means at one of said stations for forming indexing notches in the one said cartridge portions at a pre-determined location thereon, means at another of said stations for feeding a spool into each of said one cartridge portions, means at a further of said stations for applying one of the other of said cartridge portions to each of said one cartridge portions, means at a subsequent one of said stations for applying a label to the assembled cartridge portions and means at a final one of said stations for removing the assembled cartridge from said support.

3. The automatic means for assembling film cartridges as claimed in claim 2 in which said notcher comprises the combination of a notching die, a notching tool movably mounted adjacent said die for movement to registery therewith for cutting said cartridge flanges, and drive means for moving said tool into flange cutting position in registery with said die including means for synchronizing the tool and support movements.

4. Means for automatically assembling a film cartridge having cooperating hollow top and bottom portions and a spool enclosed therein comprising the combination of a support for transporting a plurality of said cartridge portions about an arcuate path, means for feeding one of said cartridge portions to said support, means for intermittently advancing said support for presenting the said one cartridge portion at a plurality of stations, tool and die means at a first of said stations for forming indexing notches in the one said cartridge portion at a pre-determined location thereon, means at a subsequent one of said stations for feeding a spool into each of said one cartridge portions, means at a further of said stations for applying one of the other of said cartridge portions to each of said one cartridge portions, and means at a final one of said stations for removing the assembled cartridge from said support.

5. Means for automatically assembling a film cartridge having cooperating hollow top and bottom portions and a spool enclosed therein comprising the combination of a rotatable turret for transporting said cartridge portions about an arcuate path, means for intermittently advancing said support for successively presenting one of said cartridge portions at a plurality of stations, tool and die means at one of said stations for forming indexing notches in one of said cartridge portions at a pre-determined location thereon, gate means at another of said stations for feeding a spool into each of said one cartridge portions, chute means at a subsequent station including a cartridge pressing plunger for applying one of the other of said cartridge portions to each of said one cartridge portions, means at a subsequent one of said stations for applying a label to the assembled cartridge portions, and means at a final one of said stations for removing the assembled cartridge from said support.

6. In an automatic machine for assembling film cartridges having a projecting flange member thereon an improved notcher for forming indexing notches at a predetermined position on the flanges comprising the combination of a plurality of cartridge supports, a notching die, means for moving said supports to position said cartridges successively at said die, a notching tool movably mounted adjacent said die for movement into registry therewith for cutting said cartridge flanges, and drive means for moving said tool into flange cutting position in registry with said die including means for synchronizing the tool and support motion.

7. The machine as claimed in claim 6 in which said die has a plurality of spaced tool receiving notches, and which further comprises means for adjusting the cutting position of said tool.

8. The machine as claimed in claim 7 which further comprises a notch position indicator coupled to said adjusting means and comprising a plurality of pre-determined notch index positions.

9. In an automatic machine for assembling film cartridges having a projecting flange member on the cartridges an improved notcher for forming a plurality of indexing notchers at a pre-determined position on the flanges comprising the combination of a plurality of cartridge supports including spaced supporting surfaces with a flange exposing aperture therebetween, notching dies, means for moving said supports to position said cartridges successively at said dies, a plurality of notching tools movably mounted adjacent said die for movement into registry therewith for cutting said cartridge flanges, and drive means for moving said tools into flange cutting position in registry with said dies including means for synchronizing the tool and support movements.

10. The machine as claimed in claim 9 which further comprises means for adjusting the cutting position of each of said tools relative to the cartridge supports independently of one another.

11. The machine as claimed in claim 9 in which said dies having a plurality of spaced tool receiving notches, and which further comprises means for adjusting the cutting position of each of said tools.

12. In an automatic machine for assembling film cartridges having a projecting flange member on the cartridges, an improved notcher for forming indexing notchers at a predetermined position on the flanges comprising the combination of a rotatably mounted turret, a plurality of cartridge supports on said turret each including spaced supporting surfaces with a flange exposing aperture therebetween, a notching die, means for moving said turret to position said cartridge supports successively at said die, a notching tool movably mounted adjacent said die for movement into registry therewith for cutting said cartridge flanges, and drive means for moving said tool into flange cutting position in registry with said die, and cam means for synchronizing the tool and support means movements.

13. The machine as claimed in claim 12 in which said die has a plurality of spaced tool receiving notches, and which further comprises means for adjusting the cutting position of said tool relative to said die notches.

References Cited

UNITED STATES PATENTS

| | | | |
|---|---|---|---|
| D. 195,746 | 7/1963 | Nerwin | D61—1 |
| 3,138,081 | 6/1964 | Nerwin | 95—31 |
| 3,325,889 | 6/1967 | Meli et al. | 29—200 |
| 3,226,816 | 1/1966 | Wilson et al. | 29—200 |

THOMAS H. EAGER, *Primary Examiner.*